R. A. SHANTZ.
VALVE GRINDER.
APPLICATION FILED FEB. 19, 1920.
1,352,840.
Patented Sept. 14, 1920.
3 SHEETS—SHEET 1.
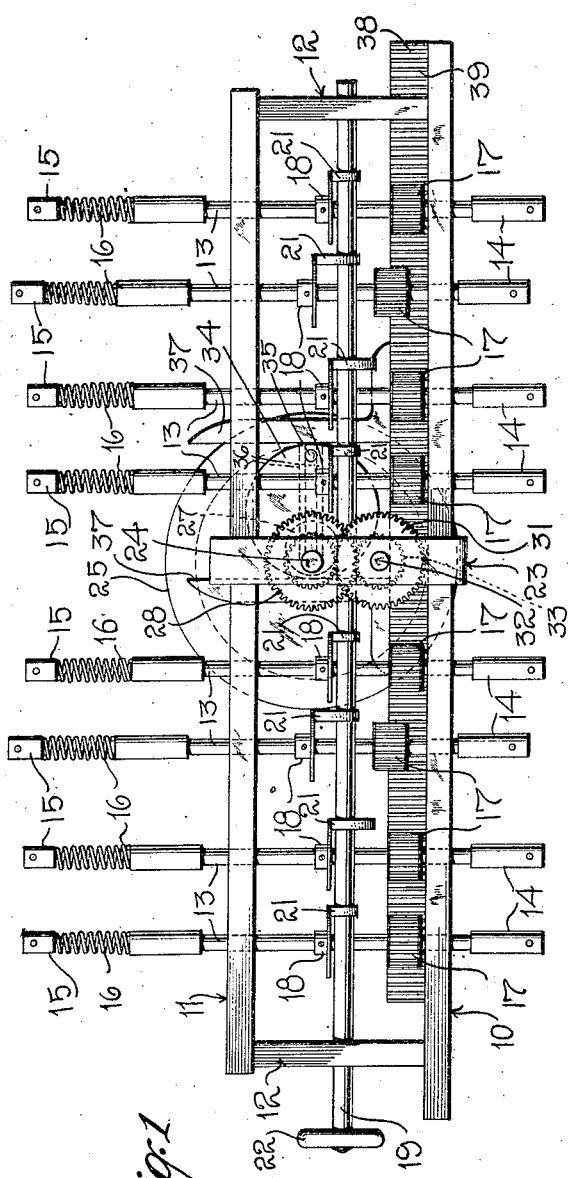
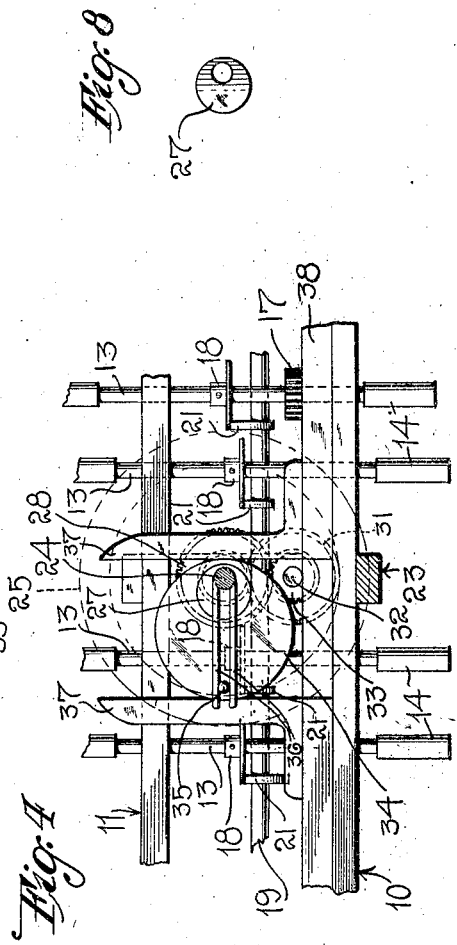
Inventor
Ralph Alfred Shantz
By Thomas R. Harner
Attorney

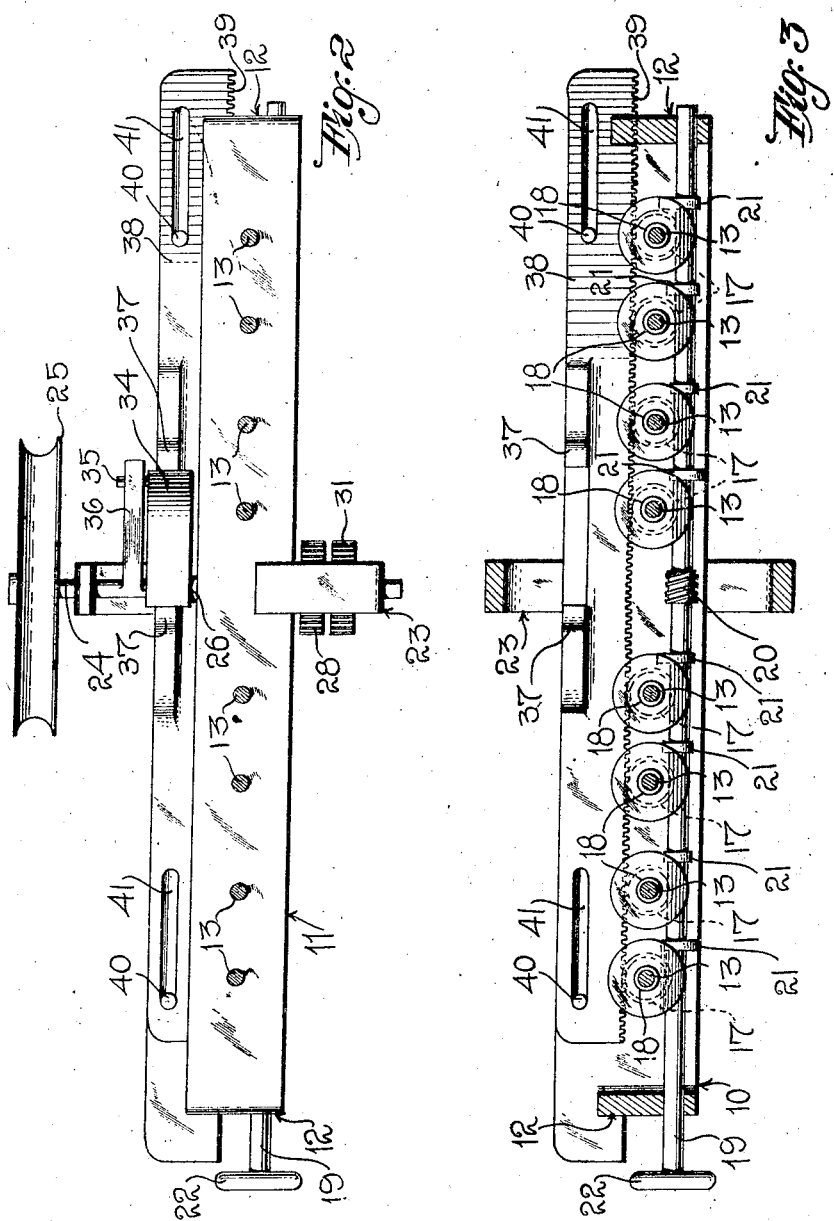

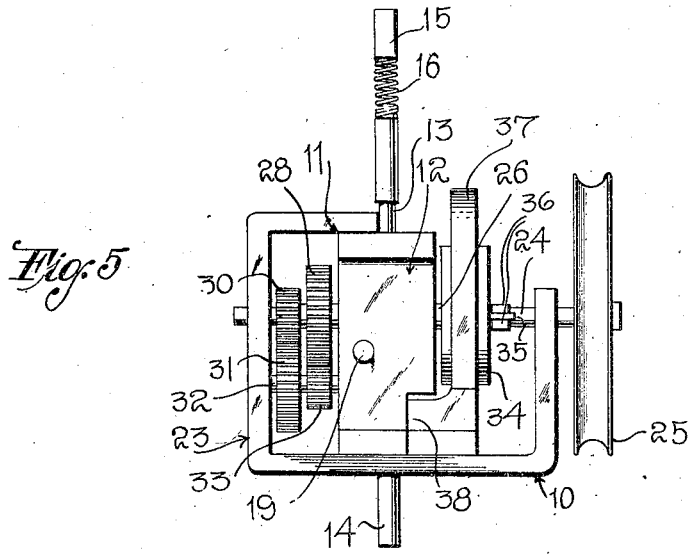
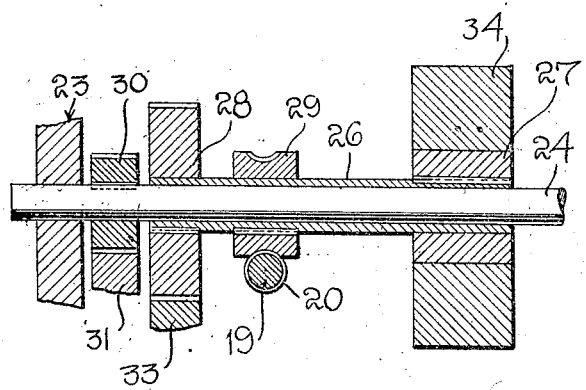

UNITED STATES PATENT OFFICE.

RALPH A. SHANTZ, OF SALEM, OREGON, ASSIGNOR OF ONE-THIRD TO OSCAR A. STEELHAMMER, OF SALEM, OREGON, AND ONE-THIRD TO JOHN F. STEELHAMMER, OF WOODBURN, OREGON.

VALVE-GRINDER.

1,352,840.  Specification of Letters Patent.  Patented Sept. 14, 1920.

Application filed February 19, 1920. Serial No. 359,835.

*To all whom it may concern:*

Be it known that I, RALPH A. SHANTZ, a citizen of the United States of America, residing at Salem, in the county of Marion and State of Oregon, have invented certain new and useful Improvements in Valve-Grinders, of which the following is a specification.

My present invention relates generally to valve grinders, and more particularly to multiple stem valve grinders adaptable to the grinding of valves in removable cylinder heads as well as in connection with motors having removable valve cages, my object being the provision of a machine which will be entirely automatic in its action in respect to the oscillation of the valves on their seats along several limited areas which are shifted gradually around the entire circumference of the valve at its seat.

More particularly my invention aims to provide an arrangement whereby valves of the above classes may be oscillated on their seats, lifted from their seats, shifted through a partial rotation, lowered on their seats, and again oscillated, this operation being repeated until the valves and their seats are properly ground tight.

With these objects in mind my invention in its specific aspect, resides in the construction, arrangement and operation of the several parts to be now described with respect to the accompanying drawings, which form a part of this specification and in which, Figure 1 is a side elevation, Fig. 2 is a sectional top plan view, Fig. 3 is a horizontal section, Fig. 4 is an enlarged side view of the central portion of the device, Fig. 5 is an end view, Fig. 6 is an enlarged detail longitudinal section through a portion of the device, taken along the line of the shaft in Fig. 5, Fig. 7 is a detail face view of one of the cams, and Fig. 8 is a similar view of the other cam.

Referring now to these figures my invention proposes a rectangular frame which comprises generally a base 10, a top 11, and ends 12, these parts forming a device of generally rectangular form which lends itself to ready inclosure so that the several gear members to be hereinafter described may if desired be made to run in oil.

Through the top and base 10 are lengthwise series of vertically alined openings in which grinding shafts 13 are mounted to both rotate and shift vertically, each of these shafts having a lower rigid valve stem engaging socket member 14 to connect with the valve stems of removable valve cages which can of course be set into proper axial alinement with the grinding shafts, and each of which grinding shafts also has at its upper end a valve stem engaging socket 15 which is connected thereto by a spring 16 forming in effect a flexible shaft coupling so as to insure proper engagement and operation with the valves of removable cylinder heads. The socket members 14 are thus below the base 10 and the socket members 15 above the top 11 of the frame, and between these portions of the frame, each of the grinding shafts has a lower gear 17 secured thereto, and an upper collar 18 rigid therewith above the gear.

Journaled lengthwise of the frame and through the frame ends 12 is a lifting shaft 19, which is both rotatable and lengthwise shiftable. This shaft has a central worm wheel 20 and a series of longitudinally spaced cam members 21, the lifting shaft being disposed slightly below the plane of the several shaft colars 18 so that upon its lengthwise shifting movement the cams 21 may be moved into and out of operative position beneath the several collars. Shaft 19 has at one end a knob or handle 22 and is by means of this handle manually actuated as to its endwise movement into and out of operative relation with the several grinding shafts.

Disposed transversely of and around the lower central portion of the frame is a U-shaped bearing bracket 23, the rear portion of which is extended upwardly and forwardly to the frame top 11 as seen in Fig. 3, and the forward and rear portions of which have journals for the forward and rear ends of the main operating shaft 24, the latter of which has a pulley 25 at its forward end adapted to receive a belt from any suitable source of power.

Around a portion of the shaft 24 between the front and rear uprights of the bracket 23 is a sleeve 26 having upon its forward end a small cam 27 and having upon its rear end a gear wheel 28. This sleeve also has at an intermediate point a worm 29 into and out of engagement with which the worm wheel 20 of the lifting shaft 19 is shiftable when the latter shaft is moved endwise.

Adjacent to the gear 28, relatively smaller gear 30 is secured on the rear portion of the main shaft 24, which meshes with a larger gear 31 on a countershaft 32, the latter having a small gear 33 in mesh with the gear 28 so that it is thus obvious that the sleeve 26 is rotated at a relatively slow speed compared to that of the movement of the main shaft 24 from which it derives movement and, by virtue of the relatively engaging worm and worm gear it is obvious that the lifting shaft 19 will, with these gears engaged, be rotated at still slower speed.

Around the cam 27 is a second larger cam 34 having a forwardly projecting pin 35 extending from its front face and engaged between the outer ends of parallel crank arms 36 projecting laterally from the main shaft 24 adjacent to the forward end of the sleeve 26. This large cam, rotating as it does around the small cam 27 and controlled as to its throw by the differentially movable small cam, is disposed between and in movable engagement with spaced uprights 37 of a sliding rack bar 38, the latter being movable upon the base 10 of the frame, opposite to the several gears 17 of the grinding shaft and with its toothed edge 39 in engagement with the several gears. This rack is guided in its movement by guide pins 40 upstanding from the frame base through lengthwise slots 41 of the rack bar, and it is thus obvious that as to its particular movement, the grinding shaft oscillating rack 38 is driven directly from the main shaft although its stroke is controlled by the differentially movable small controlling cam, the latter being indirectly driven from the main shaft through the reducing gears.

It is thus obvious that in operation, the several grinding shafts being properly connected with the stems of valves to be ground, either of their lower ends as with removable valve cages, or at their upper ends as with valve-in-head motors, transmission of power to the main shaft 24 instantly causes oscillation of each of the several grinding shafts, and this oscillation of each grinding shaft continues until the respective cam 21 of the lifting shaft, the latter being in active position, engages beneath its collar 18 and lifts the shaft, at the same time lifting valve from its seat. As seen in Fig. 1 it will be noted that each grinding shaft in its elevated position is still subjected to action by the rack bar 38, its gear 17 being still engaged with the rack teeth 39, and it is thus obvious that while each valve is thus lifted, the relative action of the differentially movable cams will continue to take place so that when the valve is again lowered as the respective cam of the lifting shaft passes from beneath the same, the valve will be lowered upon its seat at a different point and as this action continues to take place intermittently, oscillation being continuously maintained between the intermittent shifting periods, the valve will be gradually shifted around the entire seat and the grinding properly and evenly accomplished.

As the mechanism is shown, the several grinding shafts depend upon gravity alone to hold the valves seated during grinding, and it is believed this weight of the grinding shafts, with their collars 18 and gears 17 will be sufficient under ordinary circumstances. I may however supplement the action by the introduction of springs between the collars 18 for instance and the upper frame bar or top 11, the function of which is so plain as to preclude the necessity of further collaboration or a detail showing.

It is furthermore obvious that while I have shown grinding shafts in a series of eight in Figs. 1 and 2, this number may be varied by either adding to or subtracting therefrom, without materially changing or otherwise effecting the invention as herein disclosed.

It is obvious that the manual shifting of the lifting shaft 19 into and out of active position permits of ready prolongation of the oscillating periods between valve shifting periods, which may be necessary or desirable in some cases.

I claim:

1. A valve grinding mechanism including a plurality of rotatable and vertically shiftable grinding shafts, means for continuously oscillating the said shafts in both their normal and vertically shifted positions, means for actuating said oscillating means, means for intermittently shifting each of the shafts, and means for varying the stroke of the oscillating means during oscillation and vertical shifting of the shafts as described.

2. A valve grinding mechanism including a plurality of rotatable and lengthwise shiftable grinding shafts, a means for intermittently shifting the said shafts lengthwise, and means for continuously oscillating the said shafts in their normal and shifted positions, including connections for uniformly varying the extent of the oscillations during the oscillating and vertical shifting movement.

3. A valve grinding mechanism including a plurality of rotatable and lengthwise shiftable grinding shafts, a means for intermittetly shifting the said shafts lengthwise, and means having a variable stroke for continuously oscillating the said shafts in their normal and shifted positions, said last named means including gears carried by the grinding shafts, a reciprocating rack in engagement with the several gears at all times, and a cam actuating the said rack having means to automatically vary its throw during its operation.

4. A valve grinding mechanism including a plurality of rotatable and lengthwise shiftable grinding shafts, a means for intermittently shifting the said shafts lengthwise, and means having a variable stroke for continuously oscillating the said shafts in their normal and shifted positions, including gears carried by the shafts, a rack actuating the gears, a cam for actuating the rack, a second cam on which the first cam is movable, and means for imparting differential movement to the two cams.

5. A valve grinding mechanism including a plurality of rotatable and lengthwise movable grinding shafts, means for intermittently shifting the shafts in the direction of their lengths, and means for oscillating the said shafts, including means to continuously and automatically vary the extent of oscillating movement during their oscillating and vertically shifting operations as described.

6. A valve grinding mechanism including a plurality of grinding shafts, to rotate and shift in the direction of their lengths, each of said shafts having its opposite ends exposed and provided with valve stem engaging means at both ends thereof, the said valve stem engaging means at one end of each of the shafts being rigidly connected therewith and the valve stem engaging means at the opposite end being flexibly connected thereto as and for the purpose described.

7. A valve grinding mechanism comprising a plurality of grinding shafts mounted to rotate and move lengthwise, means for shifting the said shafts in the direction of their lengths, including a rotatable shaft having a plurality of grinding shaft engaging cams, said last mentioned shaft being shiftable lengthwise into and out of active position, means for continuously oscillating the said grinding shafts in their normal and shifted positions, and means for continuously varying the extent of movement of said last named means, as described.

8. A valve grinding mechanism comprising a plurality of rotatable and lengthwise shiftable grinding shafts, each provided with a gear, a rack in engagement with the several gears, a cam actuating the said rack, a driving shaft having a direct connection with the said cam for actuating the latter, a cam around which said first named cam is rotatable, means for intermittently shifting the grinding shafts in the direction of their lengths, and operative connections between the driving shaft and the inner controlling cam including speed changing gears as described.

9. A valve grinding mechanism comprising a plurality of rotatable and lengthwise shiftable grinding shafts, each provided with a gear, a rack in engagement with the several gears, a cam actuating the said rack, a driving shaft having a direct connection with the said cam for actuating the latter, a cam around which said first named cam is rotatable, means for intermittently shifting the grinding shafts in the direction of their lengths, a sleeve around the driving shaft upon which the inner controlling cam is mounted, and speed changing gears between the driving shaft and the said sleeve as described.

10. A valve grinding mechanism including a plurality of rotatable and lengthwise shiftable grinding shafts, each having a collar and a gear, a rack engaging the several grinding shaft gears, a shaft having a plurality of cam members for engagement with the collars of the grinding shafts, a drive shaft, a rack actuating cam driven by the drive shaft, a controlling cam around which the rack actuating cam is movable, a sleeve around the drive shaft having a geared connection therewith, and upon which the controlling cam is mounted, and relatively engaging gears carried by the said sleeve and the first mentioned cam carrying shaft.

11. A valve grinding mechanism including a plurality of rotatable and lengthwise shiftable grinding shafts, each having a collar and a gear, a rack engaging the several grinding shaft gears, a shaft having a plurality of cam members for engagement with the collars of the grinding shafts, a drive shaft, a rack actuating cam driven by the drive shaft, a controlling cam around which the rack actuating cam is movable, a sleeve around the drive shaft having a geared connection therewith, and upon which the controlling cam is mounted, and relatively engaging gears carried by the said sleeve and the first mentioned cam carrying shaft, said cam carrying shaft being shiftable lengthwise to move its gear into and out of engagement with the companion gear of the sleeve as described.

In testimony whereof he affixes his signature.

RALPH A. SHANTZ.